United States Patent
Bertin et al.

(10) Patent No.: US 12,120,241 B2
(45) Date of Patent: Oct. 15, 2024

(54) METHODS AND DEVICES FOR PROVING KNOWLEDGE OF A DATA ITEM BY A USER OF A BLOCKCHAIN

(71) Applicant: Orange, Issy-les-Moulineaux (FR)

(72) Inventors: Emmanuel Bertin, Châtillon (FR); Julien Hatin, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 257 days.

(21) Appl. No.: 17/599,199

(22) PCT Filed: Mar. 27, 2020

(86) PCT No.: PCT/EP2020/058807
§ 371 (c)(1),
(2) Date: Sep. 28, 2021

(87) PCT Pub. No.: WO2020/201134
PCT Pub. Date: Oct. 8, 2020

(65) Prior Publication Data
US 2022/0158841 A1    May 19, 2022

(30) Foreign Application Priority Data

Mar. 29, 2019 (FR) ........................... 1903369

(51) Int. Cl.
*H04L 9/32* (2006.01)
*H04L 9/08* (2006.01)
*H04L 9/00* (2022.01)

(52) U.S. Cl.
CPC .......... *H04L 9/3236* (2013.01); *H04L 9/0825* (2013.01); *H04L 9/3247* (2013.01); *H04L 9/50* (2022.05)

(58) Field of Classification Search
CPC .... H04L 9/3236; H04L 9/0825; H04L 9/3247
See application file for complete search history.

(56) References Cited

U.S. PATENT DOCUMENTS

| | | | |
|---|---|---|---|
| 9,893,896 B1* | 2/2018 | Yu | H04L 9/0643 |
| 10,091,004 B2* | 10/2018 | Ryu | H04L 9/3228 |
| 10,824,419 B2* | 11/2020 | Shao | H04L 9/3239 |
| 11,146,405 B2* | 10/2021 | Yuan | H04L 9/3255 |
| 11,177,961 B2* | 11/2021 | Andreina | H04L 9/30 |
| 11,356,268 B2* | 6/2022 | Balinsky | G06K 15/4095 |
| 11,368,456 B2* | 6/2022 | Chauhan | G06F 16/483 |

(Continued)

OTHER PUBLICATIONS

International Search Report and Written Opinion dated Jun. 25, 2020 for Application No. PCT/EP2020/058807.

(Continued)

*Primary Examiner* — Yonas A Bayou
(74) *Attorney, Agent, or Firm* — Knobbe, Martens, Olson & Bear, LLP

(57) ABSTRACT

A method is described for proving knowledge of a first data item by a user registered to a blockchain, the first data item belonging to the user, the method being implemented by a trusted entity registered on the blockchain. The method includes obtaining the first data item outside the blockchain, generating a second data item from the first data item, outside the blockchain, the second data item to the user, and publishing the second data item in the blockchain after the second data item has been published in the blockchain by a terminal of the user.

15 Claims, 3 Drawing Sheets

(56) References Cited

U.S. PATENT DOCUMENTS

| | | | |
|---|---|---|---|
| 2016/0218879 A1* | 7/2016 | Ferrin | G09C 1/00 |
| 2017/0141924 A1* | 5/2017 | Ryu | H04L 9/3236 |
| 2017/0155515 A1* | 6/2017 | Androulaki | H04L 9/006 |
| 2018/0198630 A1* | 7/2018 | Androulaki | G06Q 20/065 |
| 2018/0365448 A1* | 12/2018 | Uhr | G06Q 20/36 |
| 2019/0220624 A1* | 7/2019 | Uhr | H04L 9/0637 |

OTHER PUBLICATIONS

"Blockchain" downloaded from Wikipedia on May 26, 2021 from https://fr.wikipedia.org/w/index.php?title=Blockchain&oldid=183277650.

Polrot, "Les Oracles, lien entre la blockchain et le monde", Ethereum France, Sep. 13, 2016, https://www.ethereum-france.com/les-oracles-lien-entre-la-blockchain.

Al-Bassam, "SCPKI: A Smart Contract-based PKI and Identity System", Apr. 2, 2017, Department of Computer Science University College London DOI: http://dx.doi.org/10.1145/3055518.3055530.

* cited by examiner

[Fig. 1]
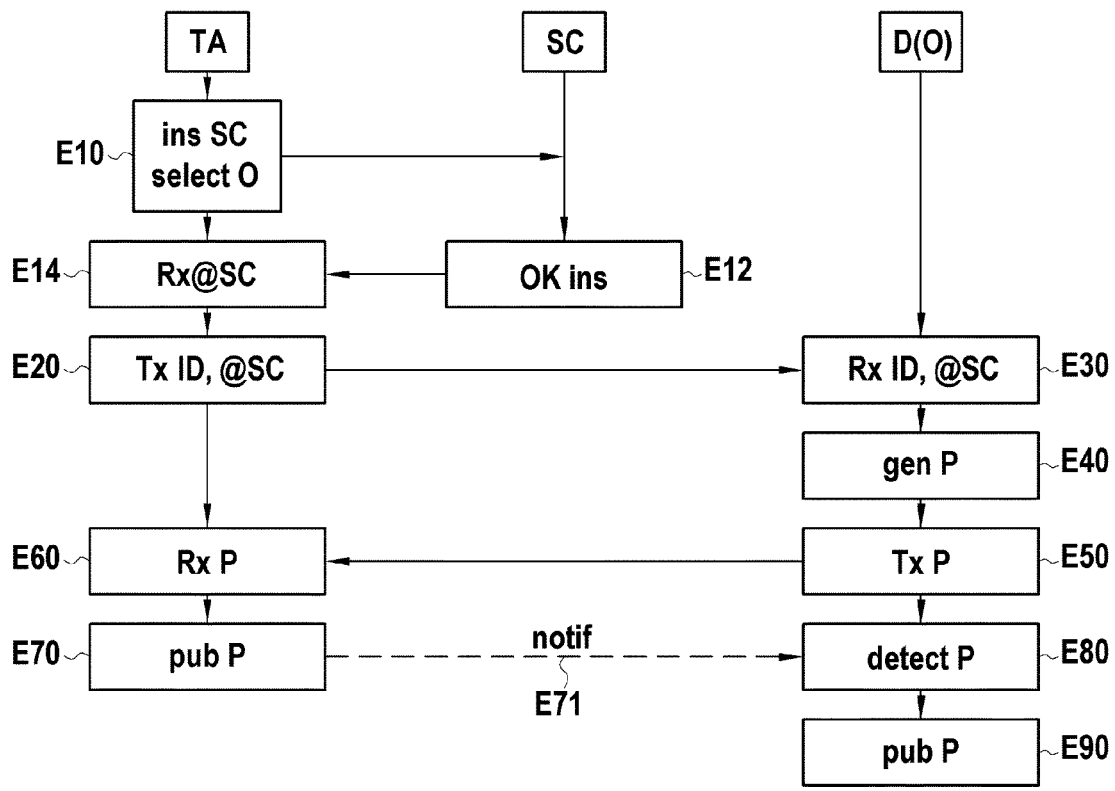
[Fig. 2]
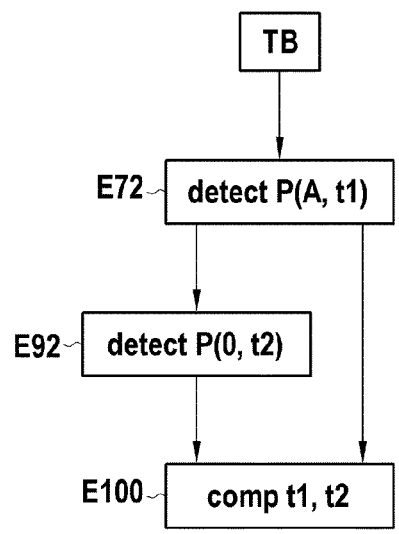

[Fig. 3]
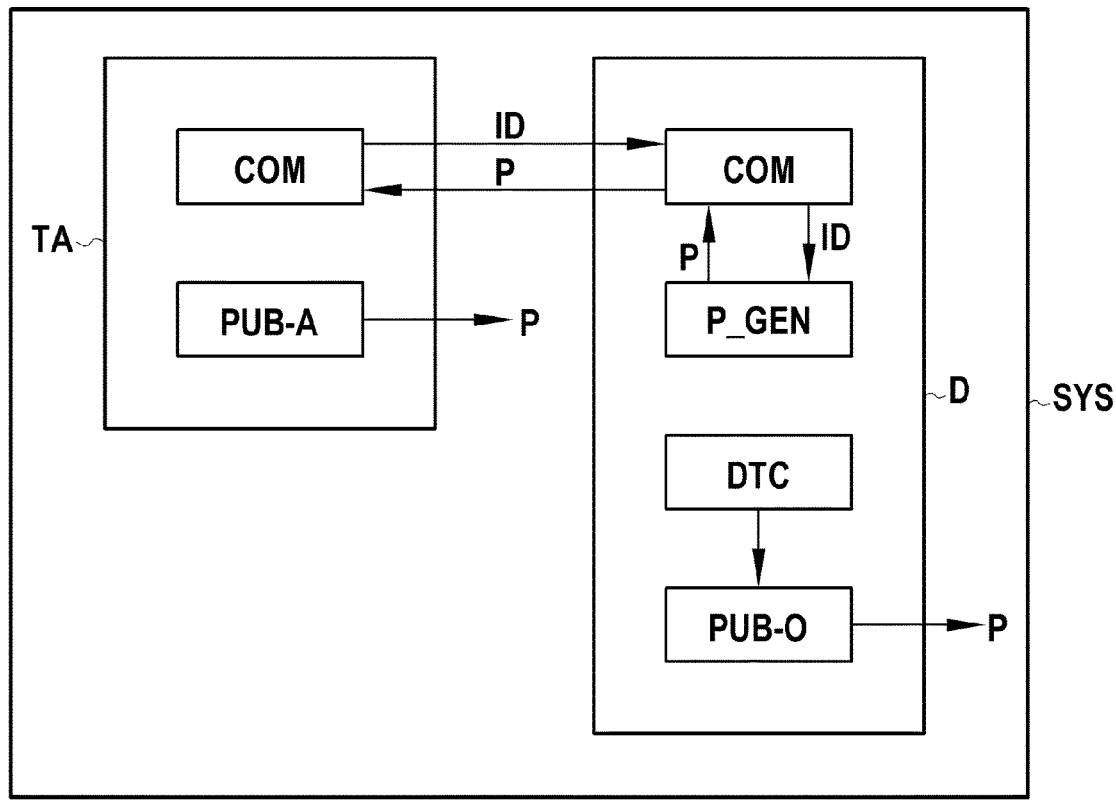
[Fig. 4]
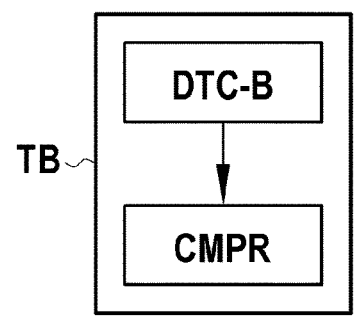

[Fig. 5]
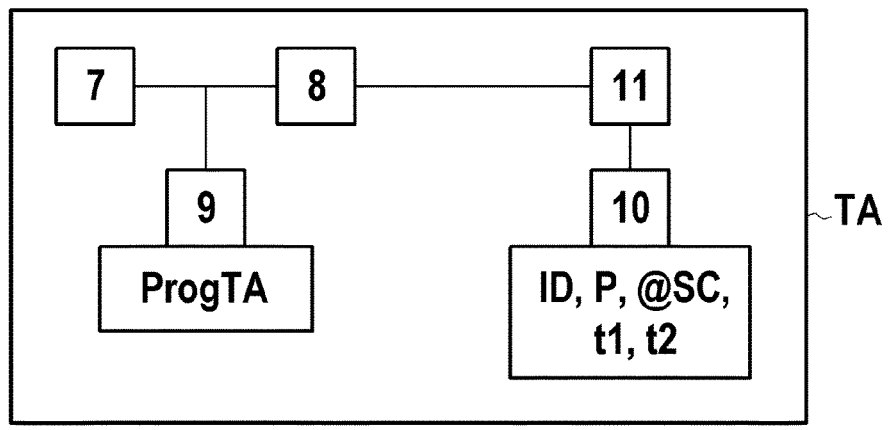
[Fig. 6]
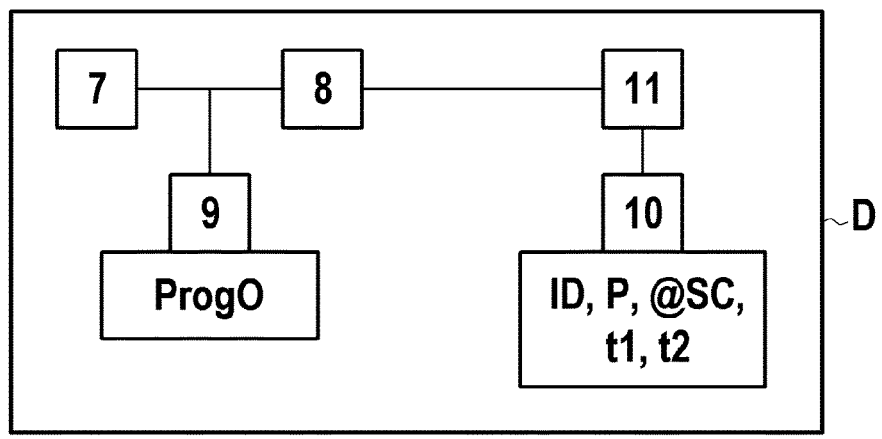
[Fig. 7]
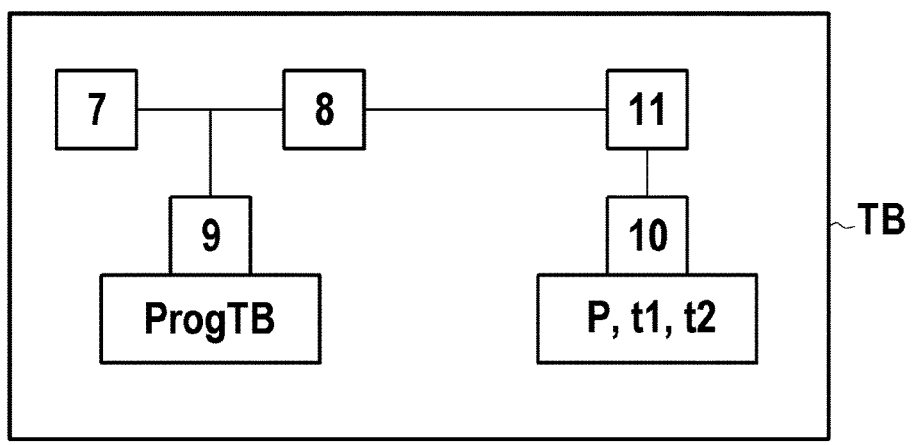

METHODS AND DEVICES FOR PROVING KNOWLEDGE OF A DATA ITEM BY A USER OF A BLOCKCHAIN

RELATED APPLICATIONS

This application is the U.S. National Phase of Application No. PCT/EP2020/058807 entitled "METHODS AND DEVICES FOR PROVING KNOWLEDGE OF A DATA ITEM BY A USER OF A BLOCKCHAIN" and filed Mar. 27, 2020, which claims the benefit of French Patent Application No. 1903369, filed Mar. 29, 2019, each of which is incorporated by reference in its entirety.

PRIOR ART

The invention relates to the general field of telecommunications networks, and more precisely to blockchain technology.

As stated in the document (https://fr.wikipedia.org/wiki/Blockchain), "blockchain technology is a technology for storage and transmission of information without any control member. Technically, it is a distributed database, in which the information sent by the users and the links internal to the database are checked and grouped at regular time intervals into blocks, the whole being secured by cryptography, and thus forming a chain.

By extension, a blockchain is a distributed database which manages a list of records protected from falsification or modification by the storage nodes; it is therefore a distributed and secure register of all the transactions made since the start of the distributed system".

The blockchains are further characterized in that their contents cannot be modified or deleted: an item of information published in a blockchain remains so forever. An item of information is said to be "published" in a blockchain if it is recorded or saved in it.

A problem that arises in blockchain technology is the certification of the data of the users. In particular, this data can relate to attributes of the users such as their names, first names, addresses, telephone numbers, account on a social media network etc. A so-called "proving" mechanism is required to ensure that the data of the users is correct (true) data.

The article by Al-Bassam, M., "A smart contract-based PKI and identity System", Proc. ACM Workshop on Blockchain, Cryptocurrencies and Contracts. ACM, 2017. pages 35-40, proposes a user identity management module based on smart contracts. In this model, a user publishes his attributes in such a way as to make them public. The attributes can then be signed by a third party on the blockchain to guarantee their authenticity.

This solution obliges the user to disclose his personal data to all the users of the chain.

There is therefore a need for a method for checking the certification of user data that does not have the drawbacks of the methods of the prior art.

SUMMARY OF THE INVENTION

The invention relates to a method for requesting the certification from a trusted entity registered with a blockchain of the knowing of a first datum by a user registered with the blockchain, the first datum belonging to the user, the method including the steps of:
receiving outside the blockchain, from the trusted entity, a second datum obtained on the basis of said first datum, the trusted entity having known of the first datum outside the blockchain; and
publishing, by a terminal of the user, of the second datum in the blockchain; said trusted entity being configured to publish the second datum in the blockchain at a date later than the date of publication of the second datum in the blockchain by the terminal of the user.

Correspondingly, the invention relates to a terminal of a user registered with a blockchain, the terminal being configured to request a certification from a trusted entity registered with the blockchain, of the knowing of a first datum by the user, the first datum belonging to the user of this terminal including:
communicating means configured to receive outside the blockchain, from the trusted entity, a second datum obtained on the basis of the first datum, the trusted entity having known of the first datum outside the blockchain; and
a publishing module configured to publish the second datum in the blockchain; the trusted entity being configured to publish the second datum in the blockchain at a date after the date of publication of the second datum in the blockchain by the terminal of the user.

The features and advantages of the certification-requesting method according to the invention given below are applicable in the same way to the terminal according to the invention and vice versa.

Within the meaning of the invention, the first datum can be a personal datum of the user (or attribute): name, first name, telephone number, postal address, e-mail address, age, profession, etc. The first datum can also be a multimedia object such as a photo, a video, a text document etc. In other words, the first datum is a datum belonging to the user or specific to the user. The user holding the first datum thus knows of this first datum.

In the description, we use the expressions "user registered with the blockchain" and "terminal (of this user) registered with the blockchain" as equivalent expressions with the same meaning. Note that one user can have several terminals.

In accordance with the invention, the terminal may be a mobile phone of smartphone type, a computer, a tablet, or any other communicating device allowing a user to access a blockchain.

As mentioned previously, a data is referred to as being published in the blockchain if it is recorded on it. To publish a datum in the blockchain, a user sends this datum to the blockchain. After the sending of the datum, a "miner" or "validator" user inserts this datum into a blockchain, then broadcasts (publishes) the new updated block. Within the meaning of the invention, the date of publication of a datum in the blockchain refers to the date on which the block is added to the chain.

Within the meaning of the invention, the publication by a terminal of a user (or by the trusted entity) denotes:
either a publication in the blockchain when this user (or the trusted entity) is a miner or validator user,
or a request for publication so that another user registered with the blockchain as a miner or validator publishes the second datum in the blockchain.

In accordance with the invention, the trusted entity can deploy an Oracle service. It is recalled that an Oracle is a service authorized to enter a datum into the blockchain at the request of a user. By way of illustration, the article "Les Oracles, lien entre la blockchain et le monde" by Simon Polrot, published on 13 Sep. 2016 on the site "ethereum-france.com" defines and describes the operation of an Oracle.

The invention allows a third party consulting the blockchain to check that the user was holding the first datum. Specifically, since the terminal is publishing the second datum (obtained on the basis of the first datum, this first datum being specific or belonging to the user) before the trusted entity, one is sure that the terminal has not simply copied the second datum published in the blockchain by the Oracle, but that it has actually received the datum from the Oracle by another route. The fact that it has received the second datum of the Oracle by another route and that this second datum was generated by the Oracle on the basis of the first datum constitutes proof that the user was holding the first datum before the Oracle made public the proof of knowing of the second datum by the user.

Within the meaning of the invention, a "date" can denote a time, an hour, a day, or any time measurement.

The invention also makes it possible to avoid the user disclosing its first datum to the users of the chain except for the Oracle. The invention therefore makes it possible to protect the personal data of the user.

However, it is envisionable that the step of publishing by the terminal further comprises the publishing of the first datum.

In an embodiment, the certification-requesting method in accordance with the invention further includes a step of sending by the user, outside the blockchain, of the first datum to the trusted entity. This step of sending the first datum, outside the blockchain, can be implemented via a communication network between the terminal of the user and the trusted entity.

The first datum can be sent, by a terminal of the user for example, in the form of a voice message or a text.

In an embodiment, the step of receiving the second datum is implemented by a terminal of the user.

The steps of the certification-requesting method in accordance with the invention, of sending the first datum, receiving the second datum, and publishing can be implemented by one and the same terminal of the user or by different terminals of the user.

In an embodiment, the certification-requesting method in accordance with the invention further includes a step of sending a request of the second datum to the trusted entity. This request may comprise the first datum or an identifier allowing the trusted entity to identify the first datum. The second datum is received from the trusted entity in response to this request.

In another embodiment, the second datum is received without a request having been sent. For example, the decision to send the second datum is taken by the trusted entity or by the Oracle.

In an embodiment, the step of publication by the terminal further includes the publication of an item of time-stamping information of this publication. This item of timestamping information can be used by a third party consulting the blockchain to compare publication dates. However, the third party can find this publication date in the blockchain; it is therefore not necessary for this date to be explicitly published.

In an embodiment, the second datum is published with the first datum.

In another embodiment, the second datum is published in association with an item of information making it possible to identify a type of the first datum, for example an item of information of "this publication relates to a telephone number of Alice (Alice is the user and her telephone number is the first datum)" type.

In an embodiment, this certification-requesting method in accordance with the invention further includes a step of sending, outside the blockchain, to the trusted entity:
  a so-called date of publication on which the step of publishing by the terminal is implemented; and/or
  a range of dates during which the trusted entity must publish the second datum in the block chain.

This embodiment makes it possible to guarantee that the second datum is published by the terminal of the user before the trusted entity.

In an embodiment of the invention, the certification-requesting method in accordance with the invention further includes a step of selecting one or more trusted entities registered with the blockchain.

This embodiment allows the user to choose the trusted entity or entities with which it collaborates to prove that it knows of the first datum. This embodiment also allows the user to choose the number of trusted entities.

The invention also relates to a method making it possible to prove the knowing of a first datum by a user registered with a blockchain, the first datum belonging to the user, this method being implemented by a trusted entity registered with the blockchain and including steps of:
  obtaining the first datum outside the blockchain;
  generating a second datum on the basis of the first datum;
  sending, outside the blockchain, the second datum to the user;
  publishing the second datum in the blockchain after the publishing of the second datum in the blockchain by a terminal of the user.

Correspondingly, the invention relates to a communication device, including a trusted entity registered with a blockchain, the device being configured to make it possible to prove the knowing of a first datum by a user registered with the blockchain, the first datum belonging to the user, the device including:
  communicating means configured to obtain the first datum outside the blockchain;
  a generating module configured to generate a second datum on the basis of the first datum;
  the communicating means being further configured to send, outside the block chain, the second datum to the user; and
  a publishing module configured to publish the second datum in the blockchain after the publishing of the second datum in the blockchain by a terminal of the user.

The features and advantages of this knowledge-proving method according to the invention explained below are applicable in the same way to the device according to the invention and vice versa.

The features and advantages of the requesting method (and the terminal) according to the invention already explained are applicable in the same way to the knowledge-proving method and to the device according to the invention and vice versa.

Note that the trusted entity sends the second datum to the user, this user being the holder of the first datum. Thus, the publication of the second datum by a terminal of the user before the trusted entity, proves that the user has actually received the second datum from the trusted entity. Since the user is the holder of the first datum, it knows of this first datum.

In an embodiment, the step of obtaining the first datum includes the receiving of it from a terminal of the user.

In another embodiment, the step of obtaining the first datum includes the receiving of an identifier allowing the trusted entity to identify the first datum.

In an embodiment, the device in accordance with the invention sends the second datum to a terminal of the user. In particular, this terminal can be different from the terminal from which the device received the first datum.

In other words, in this embodiment, the device has received the first datum from a first terminal of the user, and it sends the second datum to a second terminal of the user.

In an embodiment, the device in accordance with the invention implements an Oracle service.

In an embodiment, the second datum sent to the terminal is a single-use password, generated using an OTP (One-Time Password) method. This password can be sent to a telephone number or an e-mail or postal address of the user.

In another embodiment, the second datum is generated by a hash or an encryption of the first datum and/or a random number generated by the trusted entity.

In an embodiment, the second datum is a file signed with a private key of the trusted entity.

In an embodiment, the method making it possible to prove the knowing of the first datum further includes a step of detecting the publication of the second datum in the blockchain by a terminal of the user. This detecting step includes the reading of blocks of the blockchain to detect therein the presence of the second datum. In this embodiment, the device in accordance with the invention and containing the trusted entity monitors the contents of the data chain until the second datum is detected.

In an embodiment, the method making it possible to prove the knowing of the first datum further includes a step of awaiting a date of publication previously communicated by the user. This date of publication may correspond either to the date on which the user envisions publishing the second datum, or the date on which it wishes for the trusted entity to publish the second datum.

In an embodiment, the publishing step is implemented by the device in accordance with the invention following the detection of an addition of at least one block to the block chain.

In another embodiment, the second datum is published in association with an item of information used to identify a type of the first datum, for example an item of information of type "this publication relates to a telephone number of Alice".

In an embodiment, the steps of publishing, by the terminal and by the trusted entity deployed in the device, are implemented by methods identified in a smart contract deployed by the user of the terminal, this smart contract being also able to include addresses of the users authorized to invoke these methods.

By way of example, a method of "Publish Attribute" type making it possible to publish the first datum is only authorized to be invoked by the user. A method of "Publish Server Attribute Proof" type used to publish the second datum generated by the trusted entity is only authorized to be invoked by the trusted entity. A method of "Publish User Attribute Proof" type used to publish the second datum after its receipt by the user is meanwhile only authorized to be invoked by the user.

It is recalled that a Smart Contract is an independent computer program, which once started, automatically executes conditions defined beforehand and registered in the blockchain (https://blockchainfrance.net/2016/01/28/applications-smart-contracts/).) By way of example, the decentralized applications dApps of the Ethereum® project constitute smart contracts within the meaning of the invention.

The invention also relates to a system making it possible to prove the knowing of a first datum by a user registered with a blockchain. This system includes at least one terminal of the user, this terminal being in accordance with the invention, and a device in accordance with the invention including a trusted entity. Of course, the system can include several terminals of the user, these terminals being in accordance with the invention, and one device in accordance with the invention including a trusted entity.

The invention also relates to a method for checking the knowing of a first datum by a user registered with a blockchain, the first datum belonging to the user, this method being implemented by an item of checking equipment which can consult the blockchain and including steps of:
  detecting the publication in the blockchain by a terminal of the user of a second datum obtained on the basis of the first datum;
  detecting the publication of the second datum in the blockchain by a trusted entity registered with the blockchain; and
  checking as a function of said publications whether or not the second datum is published in the blockchain by the terminal before being published by the trusted entity, the result of said checking making it possible to determine whether or not the user knew of the first datum at a date prior to the dates of the publications.

Correspondingly, the invention relates to an item of equipment for checking the knowing of a first datum by a user registered with a block chain, the first datum belonging to the user, the item of checking equipment being able to consult the blockchain and including:
  a detecting module configured to detect in the blockchain:
    the publication by a terminal of said user of a second datum; and
    the publication of the second datum by a trusted entity registered with the blockchain, the second datum having been generated by the trusted entity on the basis of said first datum; and
  a decision module configured to check as a function of the detected publications, if the second datum was published in the blockchain by the terminal before being published by the trusted entity, the result of the check making it possible to determine whether or not the user knew of the first datum at a date prior to the dates of the publications.

The features and advantages of the requesting method and the method making it possible to prove the knowing of the first datum, in accordance with the invention, explained previously are applicable in the same way to the method and item of checking equipment according to the invention and vice versa.

In accordance with the invention, when the result of the check shows that the second datum was published in the blockchain by the terminal of the user before being published by the trusted entity, the item of checking equipment determines that the user already knew of the first datum at a date prior to the dates of the publications (by the terminal and by the trusted entity).

The blocks published in the blockchain are immutable. The duration of the check is therefore not limited.

The invention also relates to a first computer program on a recording medium, this program being able to be implemented in a computer or a terminal in accordance with the invention. This program includes instructions suitable for implementing a requesting method as described above.

The invention also relates to a second computer program on a recording medium, this program being able to be implemented in a computer or a device including a trusted entity in accordance with the invention. This program includes instructions suitable for implementing a method making it possible to prove the knowing of the first datum as described above.

The invention also relates to a third computer program on a recording medium, this program being able to be implemented in a computer or an item of checking equipment in accordance with the invention. This program includes instructions suitable for implementing a checking method as described above.

Each of these programs can use any programming language, and be in the form of source code, object code, or intermediate code between source code and object code, such as in a partially compiled form, or in any other desirable form.

The invention also relates to an information medium or a recording medium readable by a computer and including instructions of the first or the second or the third computer program as mentioned above.

The information or recording media can be any entity or device capable of storing the programs. For example, the media can include a storage means, such as a ROM, for example a CD-ROM or a microelectronic circuit ROM, or else a magnetic recording means, for example a diskette (floppy disk) or a hard disk, or a flash memory.

Secondly, the information or recording media can be transmissible media such as an electrical or optical signal, which can be routed via an electrical or optical cable, by radio link, by wireless optical link or by other means.

The programs according to the invention can in particular be downloaded over a network of Internet type.

Alternatively, each information or recording medium can be an integrated circuit into which a program is incorporated, the circuit being suitable for executing or for being used in the execution of one of the methods in accordance with the invention.

BRIEF DESCRIPTION OF THE DRAWINGS

Other features and advantages of this invention will become apparent on reading the description given below, with reference to the appended drawings which illustrate an exemplary embodiment thereof without any limitation. In the figures:

FIG. 1 is a block diagram showing the steps of a requesting method and a method making it possible to prove the knowing of a first datum by a user at a predetermined date, the methods being implemented according to a particular embodiment;

FIG. 2 is a block diagram showing the steps of a checking method, implemented according to a particular embodiment;

FIG. 3 shows functional architectures, according to a particular embodiment, of a system, of a terminal and of a device;

FIG. 4 shows a functional architecture of an item of checking equipment in a particular embodiment;

FIG. 5 shows a hardware architecture of a terminal according to a particular embodiment;

FIG. 6 shows a hardware architecture of a device according to a particular embodiment; and FIG. 7 shows a hardware architecture of an item of checking equipment according to a particular embodiment.

DESCRIPTION OF THE EMBODIMENTS

FIG. 1 is a block diagram showing the steps of a certification-requesting method implemented by a terminal TA of a user A and the steps of a method making it possible to prove the knowing of a first datum ID by the user A, implemented by a device D including a trusted entity O; the two methods being in accordance with the invention. The terminal TA and the device D are in accordance with the invention. The user A and the trusted entity O are registered with a blockchain CB. Since the first datum belongs to the user A, the user A has the knowing of the first datum ID.

The steps E10, E20, E60 and E70 described below are steps of the certification requesting method, implemented by the terminal TA.

In the embodiment described here, the trusted entity O is an Oracle.

Steps E30, E40, E50, E80 and E90 described below are steps of the method making it possible to prove the knowing of a first datum, implemented by the device D or by the trusted entity O.

During a step E10, the terminal TA deploys a smart contract SC, in which are identified methods for publishing in the blockchain which must be used by the user A and by the trusted entity O, along with the addresses of the users authorized to invoke these methods. Note however that the deployment of a smart contract only represents one particular embodiment. The methods of the invention are applicable in other situations, with other methods governing publications on the blockchain.

During this same step E10, the terminal TA selects the trusted entity O. Alternatively, the terminal TA can select several trusted entities.

During a step E12, the smart contract SC deployed in the blockchain sends a positive acknowledgement to the terminal TA to confirm to it the publication of this contract SC and returns to it the address of this contract, @SC.

The terminal TA receives this acknowledgement and the address @SC during a step E14.

During a step E20, the terminal TA sends, outside the blockchain CB, the first datum ID to the trusted entity.

In the embodiment described here, the first datum ID is an attribute identifying the user A, such as its telephone number.

The sending E20 outside the blockchain is done via a communication network between the terminal TA and the device D deploying the trusted entity. By way of example, this sending E20 can be done via a radio communication, or a wired communication. No limitation is placed on the type of communication used to transmit the first datum to the trusted entity.

In a particular embodiment, during the step E20, the terminal TA also sends to the trusted entity O the address @SC of the smart contract SC, the trusted entity O being then able to use it to publish data on the blockchain in accordance with the methods of the contract SC.

During a step E30, the trusted entity O receives this first datum ID, along with, where applicable, the address @SC of the smart contract SC.

In another embodiment, the trusted entity O can be managed by a telephone operator to which the user A has subscribed. The trusted entity O can access a database including subscriber identifiers and their telephone numbers. The terminal of the user TA can send to the trusted entity O an identifier allowing it to obtain the telephone number of the user, for example the name and first name of the user or the number of the user's identity document. The trusted entity then obtains the first datum (telephone number of the user) by polling the database.

During a step E40, the trusted entity O generates a second datum P on the basis of the first datum ID.

The second datum P may be associated with the date on which it was generated. It may be an OTP code, or a datum obtained by compression of the first datum ID, or by encryption of the first datum ID, or a file signed by a private key of the trusted entity of Oracle type.

During a step E50, the trusted entity O sends, outside the blockchain CB, the second datum P to the user A.

When the second datum P is an OTP code, the sending E50 can be done via a communication network and be addressed to a telephone number, an e-mail address or a postal address of the user A.

In the embodiment described here, this sending E50 is done via a communication network connecting the terminal TA to the device D.

During a step E60, the terminal TA receives via the communication network (outside the blockchain CB), the second datum from the trusted entity O.

During a step E70, the terminal TA publishes at a date t1 the second datum P in the blockchain CB, using in the embodiment described the method stated in the smart contract SC. More precisely, the terminal TA transmits to the blockchain a request for publication of the second datum P. The request is signed with the private key of the user A.

Alternatively, the terminal TA can use a conventional method of publication in the blockchain CB, without recourse to the smart contract SC.

During a step E80, the trusted entity O detects the publication of the second datum P by the terminal TA, by reading the blocks transmitted in the block chain CB.

Further to this detection, the trusted entity O in turn publishes, at a date t2, during a step E90, the second datum P in the blockchain CB, according to the method stated in the smart contract SC.

In another embodiment, following the publication E70 of the second datum P by the terminal TA, this terminal TA sends during a step E71 a notification to the device D to notify the trusted entity O of the publication E70. On receiving this notification, the trusted entity O then publishes (E90) the second datum P. More precisely, during the step E90, the trusted entity O transmits to the blockchain a request for publication of the second datum P. The request is signed with the private key of the trusted entity O.

In another embodiment, for example during the sending step E20, the terminal TA sends to the device D a datum relating to a publication date (t1) on which the terminal TA intends to publish the second datum P. On receiving this datum, the device D monitors the occurrence of this date t1 over time (using a countdown timer for example) and in turn publishes (E90) the second datum P upon occurrence of this date t1 (on expiry of the countdown).

In another embodiment, for example during the sending step E20, the terminal TA sends to the device D a datum relating to a publication date (t2) on which the device D must publish the second datum P. On receiving this datum, the device D monitors the occurrence of this date t2 over time (using a countdown for example) and publishes (E90) the second datum P upon occurrence of this date t2 (on expiry of the countdown). Preferably, the device D checks before this publication E90 that the second datum P has indeed been published (E70) in the blockchain CB by the terminal TA.

In another embodiment, the device D checks the publication of the datum D in the blockchain by the terminal A, then awaits the publication of a predetermined number n of new blocks added to the blockchain before publishing (E90) the second datum D. The number n can for example be greater than or equal to 3.

In the event of a fork in the blockchain CB, the device D can consider only the number of blocks added to the main branch of the chain CB.

In the embodiment described with reference to FIG. 1, the same terminal TA of the user A implements the steps of sending E20 the first datum ID, receiving E60 the second datum P and publication E70 of the latter. Alternatively, these steps E20, E60 and E70 may be each implemented by a terminal of the user A, different from the terminals implementing the other steps. For example, the sending step E20 is implemented by a first terminal of the user A and the steps E60 of receiving the second datum P and publishing E70 it are implemented by a second terminal of the user A, the second terminal being different from the first terminal.

FIG. 2 is a block diagram showing the steps of a method for checking the knowing of the first datum ID by the user A. This method is implemented by an item of checking equipment TB, the method and the item of equipment TB being in accordance with the invention.

In this embodiment, the item of checking equipment TB is registered with the blockchain CB. This item of equipment TB can be a terminal of a user B. However, to implement the checking method in accordance with the invention, it is enough for the item of checking equipment to be capable of consulting the contents of the chain CB, without however being registered.

The equipment TB consults the publications in the blockchain CB.

During a step E72, the item of equipment TB detects the publication by the terminal TA of the second datum P obtained (E30) on the basis of the first datum ID.

During a step E92, the item of equipment TB detects the publication by the trusted entity O of the second datum P.

In the embodiment described here, at least one of the publication steps E70 and E90 includes, in addition to the publication of the second datum P, that of an item of information about the type of the first datum ID, such that the item of equipment TB can determine that the second datum P was obtained on the basis of the first datum ID. For example, considering that the first datum ID includes a telephone number of the user A, one of the publications E70 or E90 also includes an item of information of "this publication relates to the telephone number of the user A" type.

By finding the same second datum P in both publications E70 and E90, the item of checking equipment TB can deduce that they both (E70 and E90) relate to the same first datum ID. Preferably, each of the publication steps E70 and E90 includes the publication of the item of information about the type of the first datum ID.

The detecting steps E72 and E92 can be implemented simultaneously, or one after the other, regardless of their order of implementation.

During a step E100, the item of checking equipment TB compares the dates of the publications, t1 and t2. In the example described with reference to FIG. 1, the date t1 is prior to the date t2; the item of equipment TB then determines that the user A knew of the second datum and, consequently, of a first datum used to generate the first datum of the first datum ID at a date of necessity prior to the date t1 of the publication E70.

In another embodiment, during the step E100, the item of checking equipment TB determines that the second datum P is recorded in two different blocks of the blockchain CB, and that the second datum P published on the initiative of the terminal A was published in a prior block (according to the order of the blocks in the chain) to that in which the second datum P was published on the initiative of the trusted entity. For example, the second datum P published on the initiative of the trusted entity is published in a block concatenated with the chain CB found after a number n of blocks counting from the block in which appears the second datum P published on the initiative of the terminal A, n being greater than or equal to 3 for example. Thus, the item of checking equipment TB determines that the publication E70 was prior to the publication E90 and determines that the user A knew of the first datum ID at the time it published the second datum P.

FIG. 3 shows functional architectures, according to an embodiment of the invention, of a system SYS, of the terminal TA and of the device D in accordance with the invention.

The system SYS includes the terminal TA and the device D.

The user A is registered with the block chain CB. The terminal TA includes communicating means COM configured to send (E20), outside the blockchain CB, the first datum ID to the trusted entity O, deployed by the device D and registered with the blockchain CB; these communicating means are also configured to receive (E60), from the trusted entity O and outside the blockchain CB, the second datum P.

The terminal TA also includes a publishing module PUB-A configured to publish, or more precisely to request the publication of, the second datum P in the blockchain CB. As previously described, the trusted entity O is configured to publish (E90) the second datum P in the blockchain at a later date (t2) than that (t1) of the publication (E70) by the terminal TA.

The device D includes:
communicating means COM configured to receive (E30) the first datum ID from the terminal TA outside the blockchain CB;
a generating module P_GEN configured to generate (E40) the second datum P on the basis of the first datum ID;
said communicating means COM being also configured to send (E50), outside the blockchain CB, the second datum P to the terminal TA; and
a publishing module PUB-O configured to publish (E90) the second datum P in the blockchain CB after the publication (E70) of the second datum P by a terminal TA of the user A.

In an embodiment, the device D further includes a detecting module DTC configured to detect (E80) the publication (E70) of the second datum P in the blockchain CB by a terminal TA of the user A. The publishing module PUB-O is configured to publish the second datum P after the detection (E80).

FIG. 4 shows a functional architecture, according to an embodiment of the invention, of the item of checking equipment TB in accordance with the invention.

This item of equipment TB includes:
a detecting module DTC-B configured to detect (E72, E92) in the block chain CB:
the publication E70 by the terminal TA of the second datum P; and
the publication of the second datum P by the trusted entity O; and
a deciding module CMPR configured to check as a function of the detected publications whether or not the second datum P was published by the terminal TA before the trusted entity O. This module determines that the user A knew of the first datum ID at a date prior to the dates of the publications.

In the embodiment described here, the terminal TA, the device D and the item of checking equipment TB each have the hardware architecture of a computer, as illustrated in FIGS. 5 to 7.

The architecture of each of them (the terminal TA, the device D and the item of checking equipment TB) particularly comprises a processor 7, a random-access memory 8, a read-only memory 9, a non-volatile flash memory 10 in a particular embodiment of the invention, and communicating means 11. Such means are known per se and will not be described in further detail here.

The read-only memory 9 of the terminal TA constitutes a recording medium in accordance with the invention, readable by the processor 7 and on which is here recorded a computer program ProgA in accordance with the invention.

The memory 10 of the terminal TA is used to store variables used for executing the steps of the certification-requesting method as previously described, such as the first datum ID, the second datum P, where applicable the address @SC of the smart contract SC, and where applicable the date of publication t1 and/or the date of publication t2.

The computer program ProgTA here defines functional and software modules, configured to request the certification of the first datum ID. These functional modules are based on and/or control the hardware elements 7-11 of the terminal TA mentioned previously.

The read-only memory 9 of the device D constitutes a recording medium in accordance with the invention, readable by the processor 7 and on which is here recorded a computer program ProgO in accordance with the invention.

The memory 10 of the device D is used to record variables used for executing the steps of the method as previously described making it possible to prove the knowing of the first datum ID by the user A of the terminal TA, such as the first datum ID, the second datum P, where applicable the address @SC of the smart contract SC, and where applicable the date of publication t1 and/or the date of publication t2.

The computer program ProgO here defines functional and software modules, configured to make it possible to prove the knowing of the first datum ID by the user A. These functional modules are based on and/or control the hardware elements 7-11 of the device D mentioned previously.

The read-only memory 9 of the item of equipment TB constitutes a recording medium in accordance with the invention, readable by the processor 7 and on which is here recorded a computer program ProgTB in accordance with the invention.

The memory 10 of the item of equipment TB is used to record variables used for executing the steps of the checking method as previously described, such as the second datum P, the date of publication t1, and the date of publication t2.

The computer program ProgTB here defines functional and software modules, configured to check the knowing of the first datum ID by the user A. These functional modules are based on and/or control the hardware elements 7-11 of the item of equipment TB mentioned previously.

The invention claimed is:

1. A method making it possible to prove the knowing of a first datum by a user wherein:

said user is registered with a blockchain,
said first datum belongs to said user, and
said method is implemented by a trusted entity registered with said blockchain and includes steps of:
  obtaining said first datum outside said blockchain;
  generating a second datum on the basis of said first datum;
  sending, outside said blockchain, said second datum to said user; and
  publishing said second datum in said blockchain after the publishing of the second datum in the blockchain by a terminal of the user.

2. The method of claim 1, further including a step of detecting the publication of the second datum in the blockchain by a terminal of the user.

3. The method of claim 1, further including a step of awaiting a publication date previously communicated by said user or a step of awaiting the detection of an addition of at least one block to the blockchain.

4. The method of claim 1, wherein said step of publishing is implemented by methods identified in a smart contract deployed by said user, the contract being also able to include addresses of the users authorized to invoke these methods.

5. A method for requesting a certification from a trusted entity registered with a blockchain of the knowing of a first datum by a user, wherein:
said user is registered with said blockchain,
said first datum belongs to said user, and
said method includes the steps of:
  receiving outside said blockchain, from said trusted entity, a second datum obtained on the basis of said first datum, said trusted entity having known of said first datum outside said blockchain; and
  publishing by a terminal of said user of said second datum in said blockchain; said trusted entity being configured to publish said second datum in said blockchain at a date later than the date of the publication of the second datum in the blockchain by the terminal of the user.

6. The method of claim 5, further including a step of sending, outside said blockchain, to said trusted entity:
  a date of publication on which the step of publishing by said terminal is implemented; and/or
  a range of dates during which said trusted entity must publish said second datum in said blockchain.

7. The method of claim 5, further including a step of selecting at least one said trusted entity registered with said blockchain.

8. The method of claim 5 wherein said step of publishing is implemented by the method identified in a smart contract deployed by said user, the contract being also able to include addresses of the users authorized to invoke this method.

9. A method for checking the knowing of a first datum by a user, wherein:
said user is registered with a blockchain,
said first datum belongs to said user, and
said method is implemented by an item of checking equipment which can consult said blockchain and including steps of:
  detecting a publication in said blockchain by a terminal of said user of a second datum obtained on the basis of said first datum;
  detecting a publication of said second datum in said blockchain by a trusted entity registered with said blockchain; and
  checking, as a function of said detected publications, whether or not the second datum was published in the blockchain by the terminal before being published by the trusted entity, the result of said checking making it possible to determine whether or not the user knew of the first datum at a date prior to the dates of the publications.

10. A non-transitory computer readable medium having stored thereon instructions which, when executed by a processor, cause the processor to implement the method of claim 1.

11. A non-transitory computer readable medium having stored thereon instructions which, when executed by a processor, cause the processor to implement the method of claim 9.

12. A communication device, said device being configured to make it possible to prove the knowing of a first datum by a user registered with a blockchain, said device including:
a trusted entity registered with a blockchain;
communicating means configured to obtain said first datum outside said blockchain;
a generator configured to generate a second datum on the basis of said first datum;
said communicating means being further configured to send, outside said block chain, said second datum to said user; and
a publisher configured to publish said second datum in said blockchain after the publishing of the second datum in the blockchain by a terminal of said user, wherein said terminal of said user is registered with said blockchain.

13. A terminal of a user, wherein:
said terminal is registered with a blockchain,
said terminal is configured to request a certification from a trusted entity registered with the blockchain, of the knowing of a first datum by the user, said first datum belonging to said user, and
said terminal includes:
  communicating means configured to receive, from said trusted entity, outside said blockchain, a second datum obtained on the basis of said first datum, said trusted entity having known of said first datum outside said block chain; and
  a publisher configured to publish said second datum in said blockchain; said trusted entity being configured to publish said second datum in said blockchain at a later date than the date of the publication of the second datum in the blockchain by said terminal.

14. An item of equipment for checking the knowing of a first datum by a user, wherein:
said user is registered with a blockchain,
said item of checking equipment is able to consult said blockchain, and
said item of checking equipment includes:
a detector configured to detect:
  the publication in said blockchain by a terminal of said user of a second datum; and
  the publication of said second datum in said blockchain by a trusted entity registered with said blockchain, the second datum having been generated by the trusted entity on the basis of said first datum; and
a decider configured to check as a function of said publications whether or not the second datum was published in the blockchain by the terminal before being published by the trusted entity, the result of said check making it possible to determine whether or not the user knew of the first datum at a date prior to the dates of the publications.

15. A non-transitory computer readable medium having stored thereon instructions which, when executed by a processor, cause the processor to implement the method of claim 5.

* * * * *